(12) United States Patent
Yabo et al.

(10) Patent No.: US 8,837,349 B2
(45) Date of Patent: Sep. 16, 2014

(54) REAL-TIME SESSIONS QUALITY-OF-SERVICE OVER RESERVATION-BASED ACCESS

(75) Inventors: Amir Yabo, Ramat-Gan (IL); Yoseph Hecht, Rehovot (IL); Magal Pinchas, Tel-Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 1139 days.

(21) Appl. No.: 12/367,645

(22) Filed: Feb. 9, 2009

(65) Prior Publication Data

US 2009/0201847 A1 Aug. 13, 2009

Related U.S. Application Data

(60) Provisional application No. 61/026,747, filed on Feb. 7, 2008.

(51) Int. Cl.
*H04B 7/185* (2006.01)
*H04W 72/08* (2009.01)
*H04W 88/06* (2009.01)
*H04W 88/04* (2009.01)
*H04W 84/06* (2009.01)

(52) U.S. Cl.
CPC ......... *H04B 7/18513* (2013.01); *H04W 72/087* (2013.01); *H04W 88/06* (2013.01); *H04W 88/04* (2013.01); *H04W 84/06* (2013.01)
USPC ........................................................ 370/317

(58) Field of Classification Search
CPC ........... H04B 7/18508; H04B 7/18513; H04B 7/18573; H04B 7/18519
USPC ................................. 370/431, 329, 437, 468
See application file for complete search history.

(56) References Cited

U.S. PATENT DOCUMENTS

| | | | |
|---|---|---|---|
| 6,628,629 B1 | 9/2003 | Jorgensen | |
| 7,292,577 B1 * | 11/2007 | Ginipalli et al. | 370/395.1 |
| 2002/0093912 A1 * | 7/2002 | Gummalla et al. | 370/229 |
| 2005/0083838 A1 * | 4/2005 | Kandala | 370/230 |
| 2005/0198261 A1 * | 9/2005 | Durvasula et al. | 709/224 |
| 2007/0104105 A1 * | 5/2007 | MeLampy et al. | 370/235 |
| 2008/0049787 A1 * | 2/2008 | McNaughton et al. | 370/468 |
| 2009/0109895 A1 * | 4/2009 | Kota et al. | 370/316 |

OTHER PUBLICATIONS

Extended European Search Report—EP 09152401.7—Mailing Date: Feb. 4, 2013.
Harald Skinnemoen et al. "Visions for Future DVB-RCS Systems, Coomunications for a Mixed Traffic Scenerio" Satellite and Space Communications, 2006 International Workshop on, IEEE, PI, Sep. 1, 2006, pp. 83-87, XP031824295, ISBN:978-1-4244-8118-5, Sections I and III.

(Continued)

*Primary Examiner* — Luat Phung
(74) *Attorney, Agent, or Firm* — Banner & Witcoff, Ltd.

(57) ABSTRACT

A collection of methods, which when combined together provide suitable bandwidth resources for real-time content exchange over a satellite-based network, wherein the network employs a reservation-based access scheme, such as but not limited to DVB-RCS. Furthermore, the methods provide suitable bandwidth wherein transmission conditions deteriorate while real-time content is being exchanged and the already allocated resources can no longer be used.

17 Claims, 9 Drawing Sheets

(56) References Cited

OTHER PUBLICATIONS

Dash D S; Durresi A; Jain R: "Routing of VoIP traffic in multi-layered Satellite Networks", Proceedings of the SPIE—The International Society Fo Roptical Engineeing, vol. 5244, No. 1, Oct. 9, 2003,-Sep. 10, 2003, pp. 65-75, XP002671114, Orlando FL, USA DOI: 10.1117/12.509456; Sections 2 and 3.

European Partial Search Report dated Oct. 16, 2012 received in corresponding EP Application No. 09152401.7.

* cited by examiner

US 8,837,349 B2

REAL-TIME SESSIONS QUALITY-OF-SERVICE OVER RESERVATION-BASED ACCESS

FIELD

The invention relates to providing suitable bandwidth resources for real-time content exchange over a satellite-based network.

BACKGROUND

Real-time content, such as voice or video streams, is often being exchanged between subscribers over a communication network. The type of network (circuit switching, packet switching), available bandwidth and the transmission media (cable, wireless, satellite, etc) may vary from one network to another. Regardless of the network type and the transmission media, in order for the real-time content to successfully traverse the network without degradation in user experience, the network must present two key properties in regard to that content:
  a. Sufficient capacity (bandwidth).
  b. Jitter-free transmission path. Low jitter up to 20 milliseconds is often considered acceptable, as its affect on voice quality is negligible and most available equipment is capable of eliminating such low jitter (using a relatively short jitter buffer).

If a communication network does not present one or both of the above properties, content may be lost or suffer significant degradation in quality, up to a level where it is no longer comprehendible by the receiving party. Therefore, if either or both of the above properties cannot be guaranteed upon session setup for as long as the session is to be maintained, it is often regarded a good practice to refuse the session rather than to attempt it under inappropriate conditions.

BRIEF SUMMARY

A satellite-based communication network comprised of one or more remote terminals (VSATs) and a central hub. Each remote terminal may also include mesh reception capabilities. Furthermore, the satellite-based network employs a scheme for accessing the satellite channels (access scheme) based on reservation techniques, such as, but not limited to, DVB-RCS (ETSI EN 301 790). Furthermore, the network is used, among other uses, for carrying real-time content, which includes but is not limited to voice and video streams. The streams may be encoded into IP-based protocols, such as but not limited to RTP, cRTP, SRTP or T.38.

Aspects of the invention include a method (such as an allocation algorithm) for providing sufficient, about jitter-free, bandwidth for real-time content in a network such as the satellite-based network.

Additional aspects of the invention include a method for applying admission control during setup of a session containing real-time content. The session may be refused if sufficient bandwidth under about jitter-free conditions cannot be guaranteed throughout the session duration.

Additional aspects of the invention include a method for applying admission control during modification of an existing session upon change in real-time content of such session. Either the session is terminated or the new content is refused if sufficient bandwidth under about jitter-free conditions cannot be guaranteed for the remaining session duration.

Additional aspects of the invention include a method for handling already open sessions carrying real-time content once the required bandwidth is no longer available for any reason, such as, but not limited to, remote terminal transmission conditions deterioration below the level necessary for using the already allocated resources, with the purpose of maintaining the open sessions as much as possible.

Other aspects of the invention include methods for realizing the above using capabilities already defined by DVB-RCS and C2P.

DETAILED DESCRIPTION

Aspects of the invention relate to satellite-based communication network comprised of one or more remote terminals (VSATs) and a central hub. This network may be used, among other uses, for carrying real-time content, including but not limited to voice and video streams, which may be encoded into IP-based protocols, such as but not limited to RTP, cRTP, SRTP or T.38, though other encapsulations are possible.

In the network, the central hub may further comprise of a network management station, one or more return-link receivers, one or more processing modules (each containing one or more processors) and a forward-link module. The forward link module may further comprise an encapsulating device and a modulator, together producing a continuous, statistically multiplexed forward-link signal, such as but not limited to a DVB-S (ETSI EN 300 421) or a DVB-S2 (ETSI EN 302 307) signal. This forward-link signal may be configured to carry all traffic from the hub to all remote terminals. Some traffic might be addressed to specific terminals, some traffic might be addressed to groups of terminals and some traffic might be broadcasted to all terminals. Furthermore, in addition to user traffic, the forward link carried by the forward-link signal may contain signaling information for managing the return link. This information may be formatted according to the protocol of the applicable access scheme, such as but not limited to DVB-RCS (ETSI EN 301 790).

Figure 1:
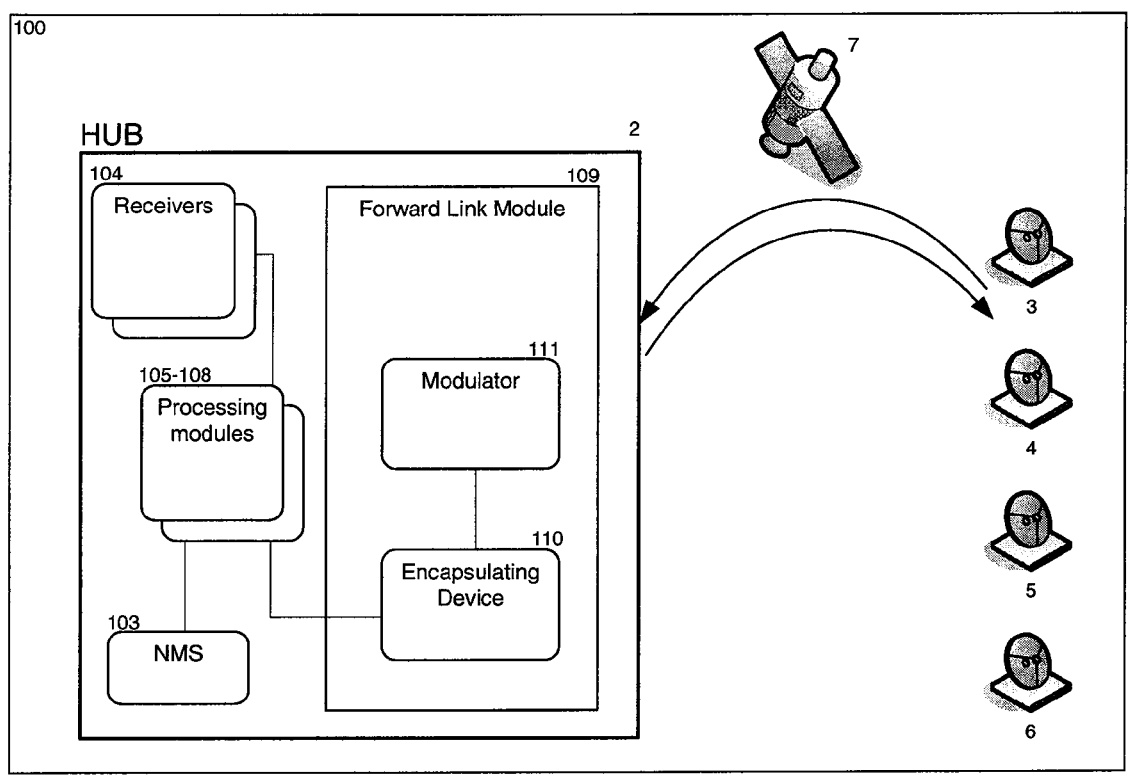
FIG. 1 shows a satellite system having a hub and a plurality of VSAT terminals in accordance with aspects of the invention.
Figure 2:
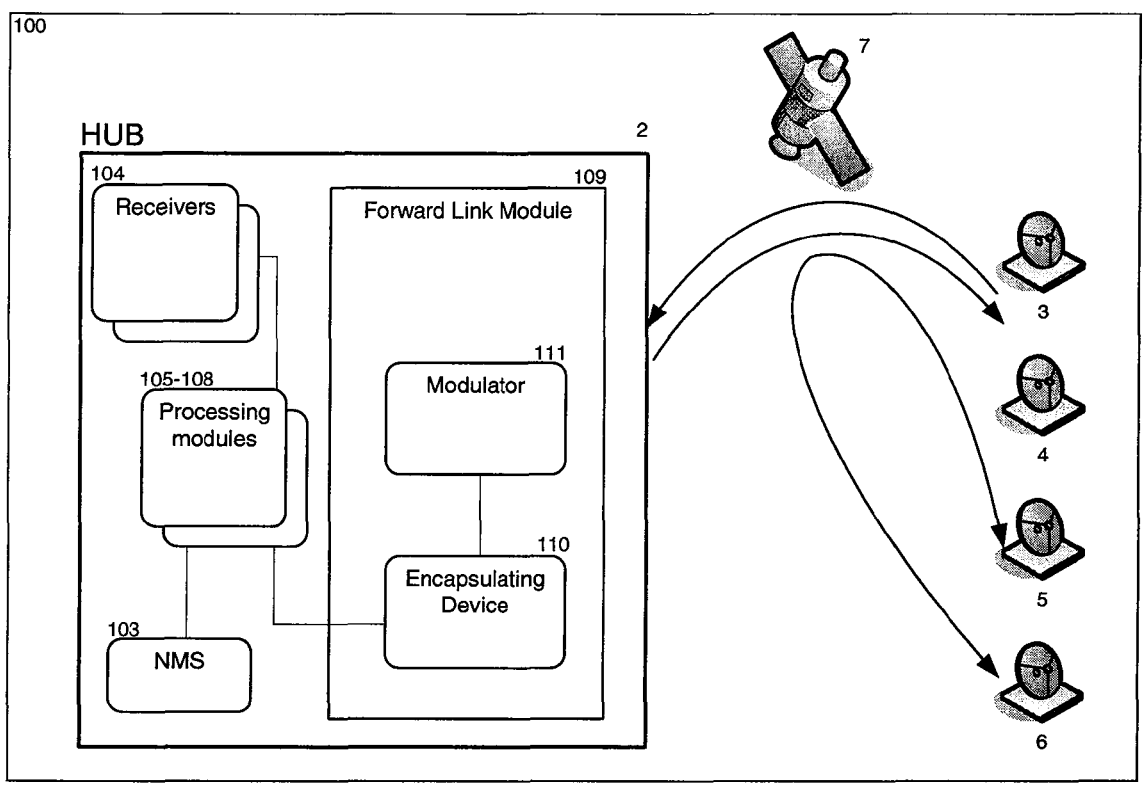
FIG. 2 shows a satellite system including a mesh network having a central hub in accordance with aspects of the invention.

In particular, a satellite system 100 is illustrated in FIG. 1 and has a hub 2 and a plurality of VSAT terminals 3, 4, 5, and 6 which communicate through satellite 7. The hub contains network management station (NMS) 103, receivers 104, processing modules 105, 106, 107, and 108, and forward link module 109 which contains encapsulating device 110 and modulator 111. FIG. 2 shows a satellite system similar to FIG. 1 except including a mesh connectivity option for direct exchange of information between VSAT terminals 3 to 6, i.e. without the exchanged information passing via the hub 2 and/or being processed by the hub.

Figure 3:
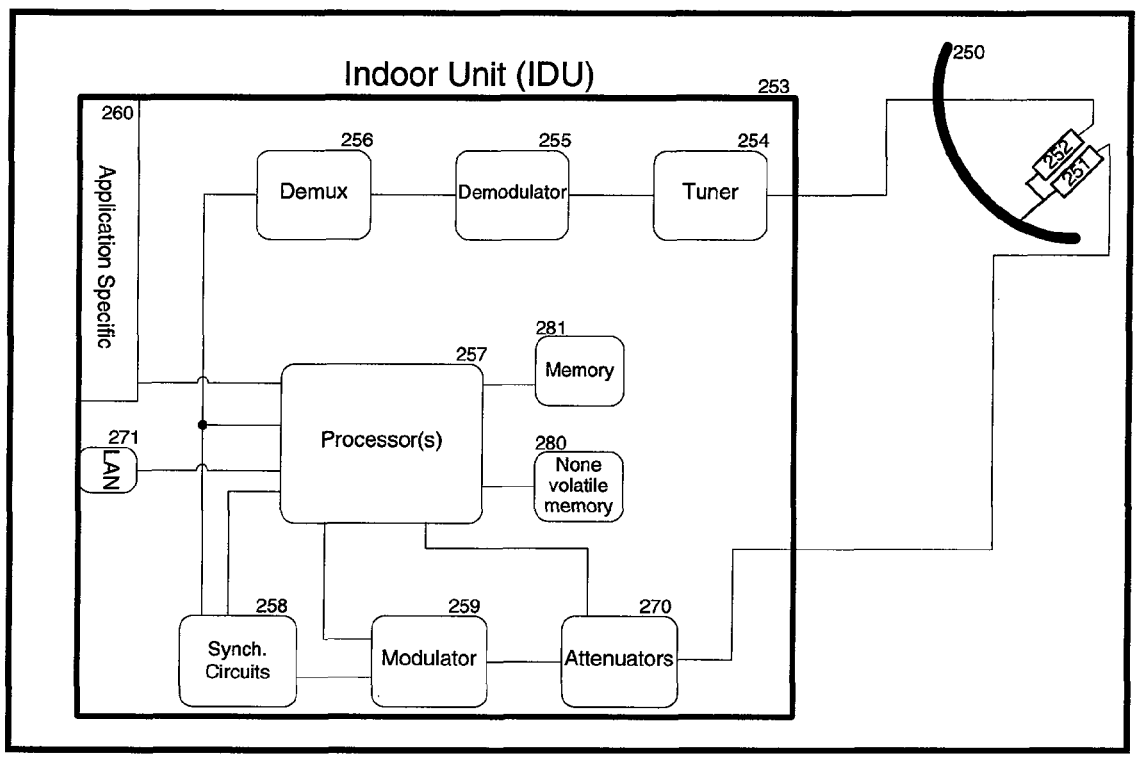
FIG. 3 shows a block diagram of a VSAT terminal in accordance with aspects of the invention.

With reference to FIG. 3, each remote terminal may comprise a satellite dish antenna 250, a satellite transmitter 251, a low-noise block amplifier 252 and an indoor unit. 253. The indoor unit 253 is further comprised of a tuner 254, a demodulator 255 compatible to the transmission method of the forward link, a de-multiplexing unit 256, one or more processors 257, synchronization circuitry 258 and a return channel modulator 259, which transmits according to the access scheme, the methods and the protocols supported by the hub. Also included may be attenuators 270, non volatile memory 280 and memory 281. Furthermore, the Application Specific block 260 may include additional hardware and/or software for processing real-time content, such as audio streams, video streams etc, including means for detecting the establishment and tear down of real-time sessions.

As illustrated in FIG. 2, each remote terminal may also include a mesh receiver, capable of receiving return link transmissions of other remote terminals and providing the received information to the indoor unit's processor(s). Each remote terminal may further include additional hardware (and software) for processing audio streams, video streams or other types of content. Any hardware (and software) needed for providing these additional capabilities may be integrated into the indoor unit or attached to it externally. Again, in reference to FIG. 3, yet additional equipment might also be connected to the terminal using one or more LAN interfaces 271 or any other interface supported by the indoor unit or any additional hardware modules that might be integrated with the indoor unit as part of Application Specific 260.

Figure 4:
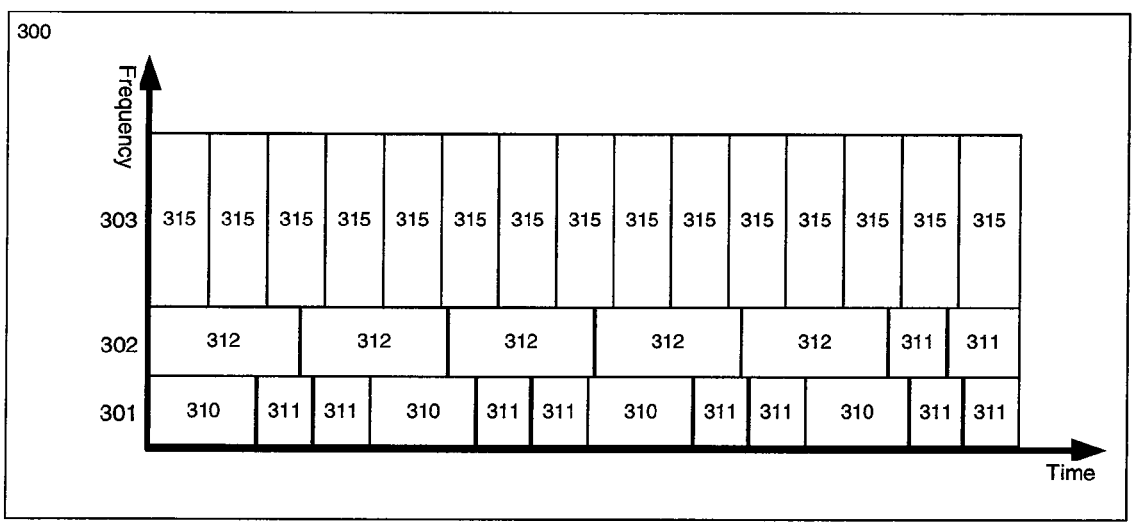
FIG. 4 shows a return-link example, containing several channel types and several timeslot types in accordance with aspects of the invention.

Furthermore, the satellite-based communication network employs a scheme for accessing the return link satellite channels (access scheme) based on reservation techniques, such as, but not limited to, DVB-RCS (ETSI EN 301 790). In these techniques, the hub may be configured to manage most, if not all, the capacity available for the return-link. A remote terminal that has information to transmit (either to the hub or to another remote terminal in mesh topology) uses a control channel (the implementation of which depends on the reservation technique used) within the return link in order to transmit one or more capacity requests towards the hub. The hub analyzes the requests and signals the remote terminal over the forward link where (i.e. on which one or more return channels) and when (i.e. at what timings) it can transmit the information. While the assigned channels may be referred to according to their respective frequencies (either using absolute frequency values or offsets from a reference frequency known both to the hub and the remote terminals), the timings are often designated in reference to a continuous sequence of super-frames, which make up the time domain. Each super-frame may contain one or more frames. Each frame may contain one or more timeslots of one or more types. Though this may not always be the case, in most cases all super-frames managed by the same capacity controller have the same structure of frames and timeslots (therefore reducing the complexity of the calculations required for managing the capacity available over the return channels). FIG. 4 illustrates a return-link example, containing several channel types 301, 302 and 303 and several timeslot types 310, 311, 312 and 315.

As stated above, the hub receives capacity requests from the remote terminals. Some of these requests might be volume-based (i.e. for a finite quantity of bytes, frames, timeslots, etc.) while others might be rate-based (i.e. for a given quantity of bytes, frames, timeslots, etc every period of time for a given interval). The decision whether to request volume or rate is that of the remote terminal and might be based on any number of criteria. During operation of the hub, some requests expire (e.g. due to allocating all the requested volume or due to the expiry of the interval given in the request) while new requests are continuously being received.

In order to support such dynamic scenarios, the hub may calculate capacity assignments quite often, e.g. several tens of times per second. In each such capacity assignment event, the hub may prioritize all pending requests (long standing as well as new requests received since the last capacity assignment event) and decide how much capacity to assign against each request. Therefore, regular rate-based requests cannot be guaranteed any capacity assignment, even more so any intervals between assignments.

The above-described method is not suitable for allocating jitter-free capacity (i.e. given quantity at exact intervals), which is essential for real-time, jitter-sensitive applications. Aspects of the invention are directed to methods of accommodating these applications.

Any jitter limit requirement adds constraints on the hub's scheduler, i.e. the algorithm that calculates how many and which timeslots to allocate against each pending capacity request. Therefore, a remote terminal should request about jitter-free capacity only when the information that has to be transmitted is generated by a jitter sensitive application. In order to do so, the remote terminal has to implement one or more methods for detecting jitter sensitive applications.

One such method may be based on tapping the application's signaling. For example, voice and video applications may use the SIP protocol for signaling the setup and tear down of calls or sessions. Other signaling protocols, such as, but not limited to, H.323, MGCP or MEGACO, might also be used for such purposes. By analyzing these signaling messages (according to the applicable protocol), a remote terminal may determine when a session is being established and when it is torn down. Furthermore, by analyzing the CODEC type negotiated between the two parties of the session, the remote terminal may determine both the required capacity for supporting the media traffic and the packet rate in which the media is to be exchanged.

Another method for detecting jitter sensitive applications is based on recognizing the media packets themselves. For example, voice and video applications may use Real Time Protocol (RTP) for encapsulating the coded audio or video stream. For other types of real-time applications, a search algorithm may search for different predetermined protocols. By analyzing the media packets (in most cases it is enough to analyze the header only) and the intervals between the first few messages exchanged, a remote terminal may determine the parameters of the session, i.e. the CODEC type and the packet rate.

Once a remote terminal recognizes an application requiring jitter-free capacity, it requests the setup of a connection, which is a logical tunnel between the remote terminal and the hub, or between the remote terminal and another remote terminal using mesh connectivity. The remote terminal does so by sending a signaling message towards the hub using a signaling protocol, such as but not limited to the Connection Control Protocol (C2P). The connection request includes, among other information items, the sustainable data rate and the maximal data rate (which may be equal to the sustainable data rate). The capacity needs may be pronounced in one or more ways, including but not limited to bps, Kbps, or in terms of so many bits, bytes, ATM cells, MPEG frames or any other volume measurement unit, per a time interval (e.g. 104 bytes every 30 milliseconds). A remote terminal may also modify the properties of an existing connection in order to increase or decrease the capacity limits (i.e. the sustainable data rate and the maximal data rate) associated with that connection as necessary based on changes in the capacity requirements of the application.

In some cases, a remote terminal may request to open a connection without any assignment of capacity at the time of connection establishment (i.e. the sustainable data rate is zero) and thereafter request the necessary capacity in association with the already open connection. Though this method is not very suitable for applying admission control for jitter sensitive applications, implementations based on that method might also be envisaged.

If the application, for which the connection is being opened and capacity is being requested is jitter sensitive, the connection request message may also include a jitter-sensitivity indication. If the connection request does not contain the indication, capacity assignment may follow the same procedure used for regular rate-based capacity requests. Therefore, the description following herein covers the case where the connection request contains a jitter-sensitivity indication.

Upon receiving the connection setup request, the hub has to determine whether at least the sustainable data rate under about jitter-free conditions can be assigned for the requesting remote terminal to transmit and in the case of mesh connectivity also for the receiving remote terminal to receive. For that purpose, the hub considers all guaranteed and/or jitter-free capacity already assigned on the relevant channels to other existing connections (i.e. timeslots specifically assigned to jitter-sensitive connections). The hub does not consider any other pending capacity requests, including for other connections, which are not jitter sensitive, as these are not guaranteed nor jitter sensitive. Since in most cases the time domain can be represented by a continuous sequence of uniform frames or super-frames, timeslots assigned to a jitter sensitive connection are considered assigned in every consecutive frame or super-frame until a request to close that connection is received or the connection's pre-determined interval expires. Therefore the hub may limit its analysis to a single frame or super-frame while also considering the interval between the last assignment in the super-frame and the first assignment in the (next) super-frame.

Given the specific timeslots assigned to existing jitter-sensitive connections, the hub determines whether the new jitter-sensitive connection can be assigned at least the requested sustainable data rate and whether the resulting number of timeslots can be evenly spread over the time domain, with the intervals between them being as even as possible. In order to increase the probability of success, some small jitter around the nominal timing may be allowed. However, since the intervals between assigned timeslots may differ by as much as twice the allowable jitter, the allowed jitter should not exceed 10 milliseconds (or else the assigned capacity could not be regarded as about jitter-free).

The hub may determine the number of required timeslots per frame or super-frame from the data rate specified in the connection setup request. The hub may then attempt to evenly distribute the number of timeslots across the frame or super-frame. Furthermore, the hub may calculate the nominal interval between two adjacently assigned timeslots as the product of the frame or super frame duration divided by the number of timeslots required per frame or super frame. After establishing the above information, there could be one or more possible assignment, all adhering to the calculated interval. The hub may then examine the assignment options until an assignment for which all timeslots are free (i.e. not already assigned for other connections) is found. For that purpose, if a timeslot at the nominal timing is already assigned, the hub may replace it with another timeslot, as long as the time interval between the nominal timeslot and the replacement is not greater than 10 mSec, as described above. If a free assignment under the conditions is found, the hub may acknowledge the connection setup. If all possible assignment options, including possible limited jitter, are exhausted and no free assignment is found, the hub has to reject the connection setup request.

Furthermore, whenever the hub assigns capacity in any given time-slice for regular capacity requests (either connection related or not), only timeslots, which are not yet assigned to any jitter-sensitive connection, may be assigned against such requests. Therefore once a jitter-sensitive connection is assigned capacity over specific timeslots, the assigned timeslots become guaranteed, about jitter-free capacity associated with that connection.

Once the hub finishes its analysis, it has either assigned capacity to the newly requested jitter-sensitive connection or concluded that such assignment cannot be made at that time. The hub then signals its decision to the requesting terminal by sending a signaling message over the forward link according to the applicable signaling protocol, such as but not limited to the Connection Control Protocol (C2P). As long as the connection is open, the hub may include information regarding timeslots assigned for the connection within the forward-link signaling, together with all other assignments.

In case the requested jitter-free capacity cannot be allocated (either due to lack of capacity as a whole or because no allocation that satisfies the jitter requirement is possible), the hub rejects the connection setup request. The requesting remote terminal may then proceed in a number of ways.

The remote terminal may practice admission control, and reject the application. Furthermore, the remote terminal may also take action in order to terminate the application. For example, in case of a voice call, if the remote terminal is capable of tapping the call's signaling, the remote terminal may send a termination message (according to the applicable protocol) to the requesting entity, causing the voice equipment to generate an appropriate tone towards the user. In another case, the remote terminal may close TCP connections in order to terminate signaling applications transported over TCP, therefore causing the abortion of the call attempt.

If tapping the call's signaling is inapplicable for any reason, another option for a remote terminal being refused adequate bandwidth for a real-time application session is to discard the traffic. This option is particularly applicable if it is understood that without such guaranteed bandwidth and jitter-free allocation the application cannot perform adequately and the network operator wishes to minimize any network resources waste.

Another option for the remote terminal, which can be applied to delay insensitive applications, is to reattempt the connection setup after a short delay. In some cases, repetitive attempts might result from the application itself therefore the remote terminal may not be required to independently initiate them. As the network is dynamic and capacity assignments may change significantly during a short interval, another attempt after a short interval may be positively acknowledged by the hub.

Yet another option for the remote terminal, if so configured, is to attempt the transmission of the application's content over regular rate-based or volume-based capacity, without any guarantee of sufficient capacity or jitter limit. This option might be applicable and acceptable when the network operator has means for recognizing such conditions and charging these sessions less than it charges guaranteed quality sessions.

In case the requested capacity is secured and the jitter limit is guaranteed, the hub signals the requesting remote terminal that the connection has been successfully established. In case of mesh connectivity, signaling is also sent to the receiving remote terminal. In some implementations of mesh connectivity, the receiving remote terminal might be signaled first and the originating remote terminal is signaled of the successful connection setup only if the receiving remote terminal acknowledges the connection establishment on his part. Depending on the access scheme and the protocols used, the information regarding the actual timeslots allocated and associated with the connection may be incorporated in the connection setup signaling message, or conveyed to the remote terminals using other forward-link signaling together with all other assignments, such as in the case of the TBTP table of DVB-RCS.

Furthermore, the hub marks the allocation of each timeslot associated to an open connection with a network-unique combination of one or more identifiers (to be referred to as "identifier" hereafter). This identification method may also be used in regard to capacity allocated to connections, which are not jitter-sensitive. The remote terminal becomes aware of the identifier during the connection setup procedure. This identifier then enables the remote terminal to distinguish between timeslots assigned for different connections that might simultaneously exist on the same remote terminal. The remote terminal then properly schedules the content of each application to be transmitted on the timeslots associated with its dedicated connection. Therefore the content of applications that trigger the opening of jitter-sensitive connections is transmitted over the return-link on guaranteed about jitter-free capacity. Furthermore, for applications such as voice or video, each call or session may trigger the opening of a separate jitter-sensitive connection. Therefore, the content of each session within such application is transmitted over the return-link on guaranteed about jitter-free capacity allocated separately to each such session. Consequently, the quality of service allotted to each such session is absolute and unaffected by traffic behavior in any of the other sessions that might be simultaneously active through the same remote terminal.

Furthermore, in addition to the event of session establishment, the hub and the remote terminal may respectively exercise the above methods upon change in the content being delivered via an already open jitter-sensitive connection. For example, a session may start containing compressed speech and after a while the same session may be used for transmitting facsimile pages, which may require higher capacity. In yet another example, a session may start containing only speech and thereafter a high bandwidth video stream may replace the speech content over the same session.

A remote terminal, using one or more of the methods described above, having detected a change in content in an existing jitter-sensitive session, which mandates either higher or lower capacity assignment, may request to modify the properties of the applicable connection. The remote terminal may do so by sending a signaling message using a signaling protocol, such as but not limited to the Connection Control Protocol (C2P). In the modification request, both the sustainable data rate as and the maximal data rate may differ from the current capacity assignment, in either direction (i.e. higher or lower).

The hub, upon receiving the modification request, using one or more of the methods described above, may determine whether capacity can be assigned as per the new capacity requirements included in the modification request while adhering to the jitter restrictions described above. The hub may use any capacity already allocated for the connection, in part or in whole, as part of the new assignment.

Once the hub finishes its analysis, it has either assigned capacity according to the new requirements of the jitter-sensitive connection or concluded that such assignment cannot be made at that time. The hub then signals its decision to the requesting terminal by sending a signaling message over the forward link according to the applicable signaling protocol, such as but not limited to the Connection Control Protocol (C2P). If a new capacity assignment was made, the hub may send a modification acknowledge message and thereafter include information regarding the new timeslots assigned for the connection (some of which or all of which may be part of the previous assignment as well) within the forward-link signaling, together with all other assignments. If a new capacity assignment was made for a mesh connection a modification acknowledge message may also be sent to the receiving remote terminal. If a new capacity assignment was not made, the previous assignment remains in effect. The hub may send a modification rejection message (which may be of a similar format to that of the modification acknowledge message, except for containing a failure indicator) and thereafter maintain the previous information regarding timeslots assigned for the connection within the forward-link signaling.

If the modification request is rejected, upon receiving the modification reject message the remote terminal may practice admission control in any one or more methods, including the generation of appropriate signaling towards the requesting application, termination of TCP connections and discarding of the excessive traffic, for which capacity was not assigned. These methods may be used in order to maintain the session at its previous status, allowing the end-users to both maintain any previous connectivity method and retry the change in content again thereafter, without the need to reestablish a new session. As the network is dynamic and capacity assignments may change significantly during a short interval, another attempt after a short interval may be positively acknowledged by the hub.

In another implementation, the remote terminal may practice admission control in any one or more of the methods previously described in order to terminate the session entirely and close the connection. This option is particularly applicable if as a result of the modification rejection the application cannot continue to perform adequately thereafter and the network operator wishes to minimize any network resources waste.

Another aspect of this invention deals with providing continuous quality of service when transmission conditions for remote terminals deteriorate.

For the return-link, possible realizations of the satellite-based communication network may use channels of different (symbol) rates as well as using multiple modulations and coding, on the same or different channels. Furthermore, the modulation and coding may not be constant on any given channel and vary from one timeslot to another. Each combination of channel rate, modulation and coding may produce a different timeslot type. Each timeslot type may have a different minimal reception level (e.g. C/N or $E_S/N_0$) requirement for insuring proper reception (e.g. BER below a certain level).

On the other hand, transmission capabilities and physical link conditions may vary from one remote terminal to another. Either temporarily or continuously, a remote terminal might not be able to use some of the timeslot types, as its link conditions and transmission capabilities are not sufficient to insure the required minimal reception levels applicable to those timeslot types.

Therefore, in the satellite-based network, a remote terminal may signal its transmission capabilities to the hub and the hub may be capable of measuring or otherwise estimating the power level (e.g. $E_S/N_0$) of received return-link signals. Based on such measurements or estimations, the hub may determine which return-link channels and timeslot types can be allocated to each remote terminal so that reception could be possible. In addition, remote terminals may be capable of adjusting their transmission power levels according to the hub's measurements or estimations, which might be conveyed to them over the forward-link signaling channel.

As previously described, each jitter-sensitive connection is assigned capacity using fixed allocations, i.e. the allocated timeslots remain the same in each super-frame until the connection is terminated or a request to change the allocated capacity is received. The allocated timeslots are determined at the time of connection establishment, based on the transmission capabilities and the link conditions of the remote terminal at that time (if capacity requirements change while the session is active, the allocation might be modified according to the same principles, i.e. considering the link condition and capabilities of the remote terminal at the time of modification). As previously mentioned, link conditions may vary in time. Therefore some or all of the timeslots allocated during connection establishment (and/or modification) might become unsuitable for the specific remote terminal they were allocated to as its capabilities will become no longer sufficient for insuring proper reception at the hub. Normally, such scenario causes a significant degradation in user experience, which may eventually lead to disconnection of the affected sessions.

As the hub may be capable of measuring or otherwise estimating the power level (e.g. $E_S/N_0$) of received return-link signals, it may also detect any significant degradation in remote link transmission capabilities. In case the remote terminal is capable of adjusting its transmission level, such detection process might involve also receiving information received from the remote terminal itself, such as whether or not the remote terminal is capable of increasing its transmission power. Once the hub detects such degradation and determines that the remote terminal can no longer transmit over certain timeslot types, the hub may examine some or all assignments to jitter-sensitive connection requested by the specific remote terminal. For each such connection, the hub may examine whether all the allocated timeslots are of the types still supported by the remote terminal.

If one or more allocated timeslots for a given jitter-sensitive connection is of a type, which the remote terminal can no longer support, the hub will repeat the allocation procedure for that connection, as though a request for modifying that connection has just been received. The hub will attempt to allocate about jitter-free capacity for the connection while accounting for the current capabilities of the remote terminal.

If such assignment is possible, the hub will substitute the previous assignment with the new assignment. As the new assignment is also about jitter-free, some jitter is expected only once during the transition between the previous assignment and the new assignment. The effect of such one-time jitter on user experience is minimal and the application is expected to offer good user experience thereafter.

If the hub cannot find a new assignment for the connection, the hub may leave the connection open using the previous assignment. As link conditions might change quite quickly, the application might survive a short-termed degradation in performance and continue normal operation once the link conditions improve. Furthermore, if link conditions remain deteriorated over a period of time exceeding a certain interval, the hub may try the previously described capacity substitution procedure again. As the network is dynamic and capacity assignments may change significantly during a short interval, another attempt after a short interval might be successful.

Another option for the hub, in case a substitute assignment cannot be found, is to close the connection. This option might be used either upon failure of the first attempt to find an alternative assignment or after failure of several such retries. This method might be advantageous when a significant portion of the network experiences the degradation. Instead of providing poor quality for all affected connections, at least some connections might be preserved at best quality of service while other jitter-sensitive connection will be terminated.

The algorithm may be extended to mesh connectivity as well. The hub may receive information from remote terminals regarding the reception level of each mesh connection. Based on these measurements, the hub may detect degradations in mesh links and then use the same algorithm for substituting the capacity assignment to one still sustainable by the mesh link conditions.

Another aspect of this invention may regard quality-of-service between sessions. Sessions, even within the same application, may be assigned different levels of priority. Originator's address (user priority), destination address (e.g. dialed number, IP address, etc), exchanged content and other factors may determine the priority of a session. Both the hub and the remote terminal may use session priority information for the purpose of reaching more educated decisions once the available resources (e.g. transmission capacity, hardware circuitry, etc) are insufficient for supporting all the requested sessions.

For example, a remote terminal may request the establishment of a high priority session and the hub may determine that the remaining free (i.e. unassigned) capacity that might be used for this purpose is insufficient or otherwise unsuitable for supporting the high priority session. The hub may then decide either to reduce assigned capacity to one or more already active lower-priority sessions or even to terminate one or more such lower-priority sessions in order to free sufficient capacity for the higher-priority session.

In another example, a remote terminal may detect a need to establish a new high priority session while its hardware, software and/or other resources are already fully utilized for supporting other existing sessions. The remote terminal may then decide to terminate one or more of its already active lower-priority session in order to free sufficient resources for supporting the higher priority session.

Aspects of the invention are further illustrated in FIGS. 5-9.

Figure 5:
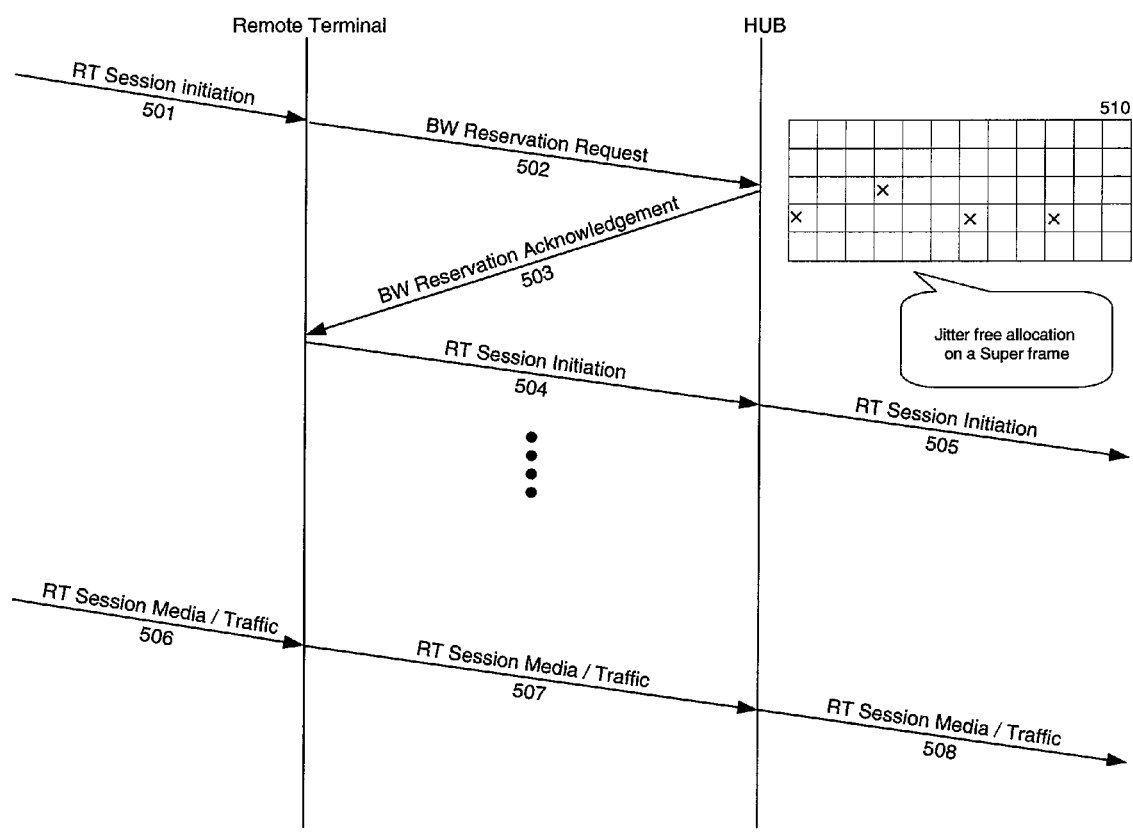
FIG. 5 shows a scenario of a real-time session establishment including a bandwidth reservation phase and an admission control phase in accordance with aspects of the invention.

FIG. 5 illustrates a scenario of a real-time session establishment including a bandwidth reservation phase and an admission control phase. Upon detecting the initiation of real-time session 501 using any of the methods described above, the remote terminal may send a bandwidth reservation request 502 to the hub. The hub, using the methods described above, may then allocate the necessary number of timeslots as shown in the example map 510. In this example map, the vertical axis represents the frequency domain, the horizontal axis represents the time domain and the interval shown is that of one instance of the minimal cyclic duration, e.g. a super-frame. As shown in map example 510, the timeslots are evenly spread over the time domain constituting an about jitter-free allocation.

Once the hub determines the allocation, it sends a bandwidth reservation acknowledgement 503 to the remote terminal. Only at this time the remote terminal may forward the real-time session initiation message(s) 504, 505 towards their destination. If the session is successfully established, sometime thereafter media packets 506-508 may be transmitted from the end-point via the remote terminal towards their destination. These packets are transmitted over the bandwidth allocated by the hub during the session establishment phase.

Figure 6:
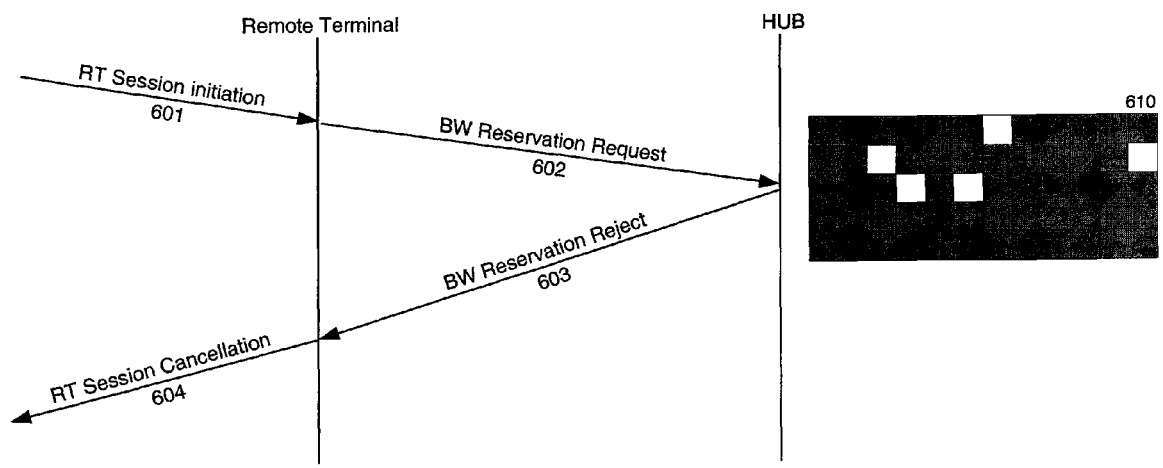
FIG. 6 shows a scenario where establishment of a real-time session is denied.

FIG. 6 shows a scenario where establishment of a real-time session is denied. Upon detecting the initiation of real-time session 601 using any of the methods described above, the remote terminal may send a bandwidth reservation request 602 to the hub. As shown in the example map 610, most of the bandwidth managed by the hub is already in use. Furthermore, though there might be enough unallocated timeslots to support the necessary traffic rate, these timeslot cannot be used for comprising an about jitter-free allocation. Therefore the hub sends a bandwidth reservation rejection 603 to the remote terminal, which drops the session initiation message 601 and does not forward it to its destination. The remote terminal may send a cancellation message 604 to the end-point as a reply to its session initiation message 601. In other embodiments, where the remote terminal does not support the protocol used by the end-point, the remote terminal may take other actions in order to terminate the session including taking no action at all and therefore causing the session to be dropped by the end-point, for example due to an applicable supervision timer.

Figure 7:
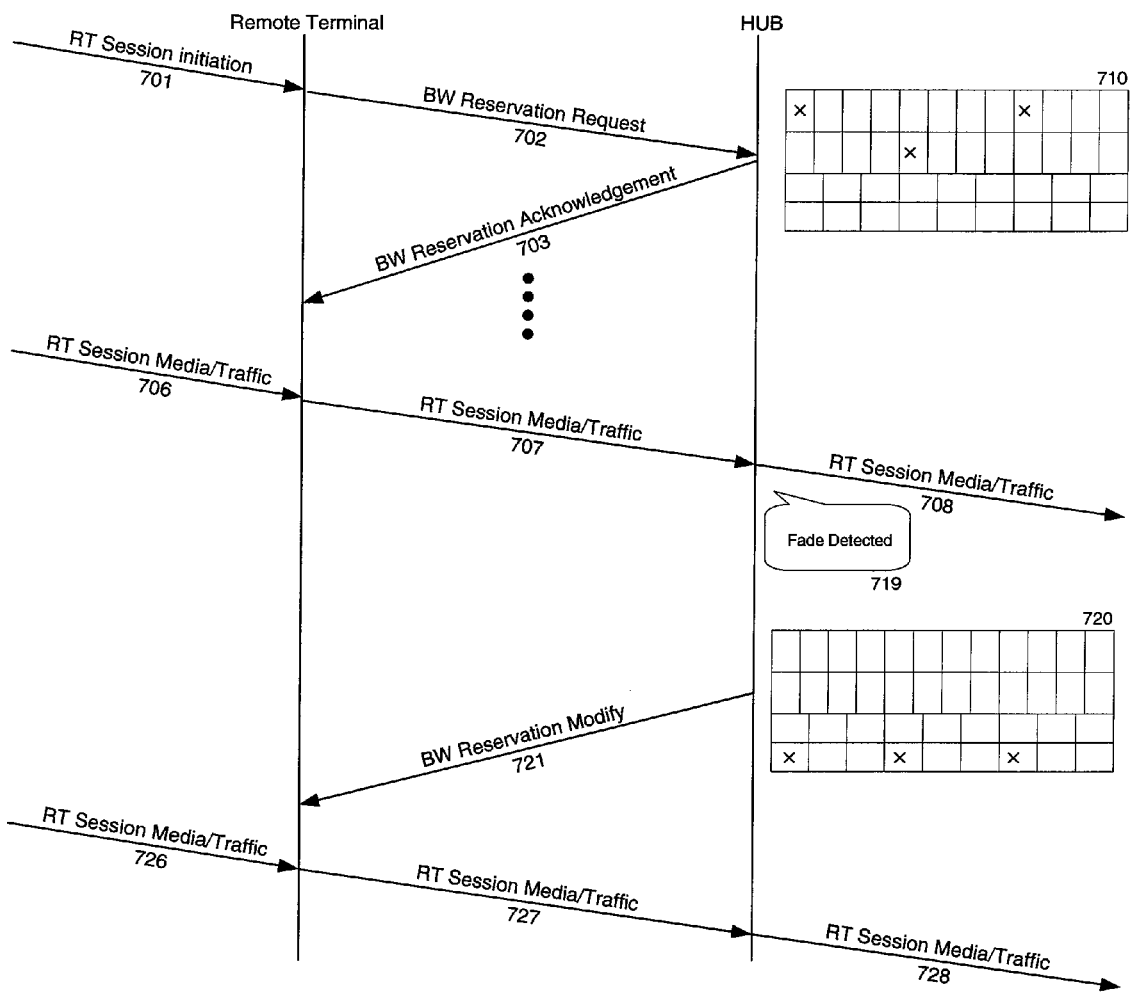
FIG. 7 shows a scenario where rain-fade is detected by the hub while a real-time session is active and where the hub successfully manages to reallocate resources for the session.

FIG. 7 shows a scenario where rain-fade is detected by the hub while a real-time session is active and where the hub successfully manages to reallocate resources for the session. Session setup is similar to the one described in FIG. 5 as shown by messages 701 to 708 and the example map 710. While the session is ongoing, the hub may detect degradation in the remote terminal's transmission capabilities (719). If the degradation is such that the already allocated timeslots are no longer usable, the hub may attempt to reallocate the necessary bandwidth while maintaining about no jitter over more robust timeslots as shown in the two lower rows of example map 720. The hub then uses the return channel signaling channel over the forward link to notify the remote terminal of the change in its allocated bandwidth. The remote terminal may then continue to send the real-time media packets 726, 727 and 728 over the new allocations towards their destination.

Figure 8:
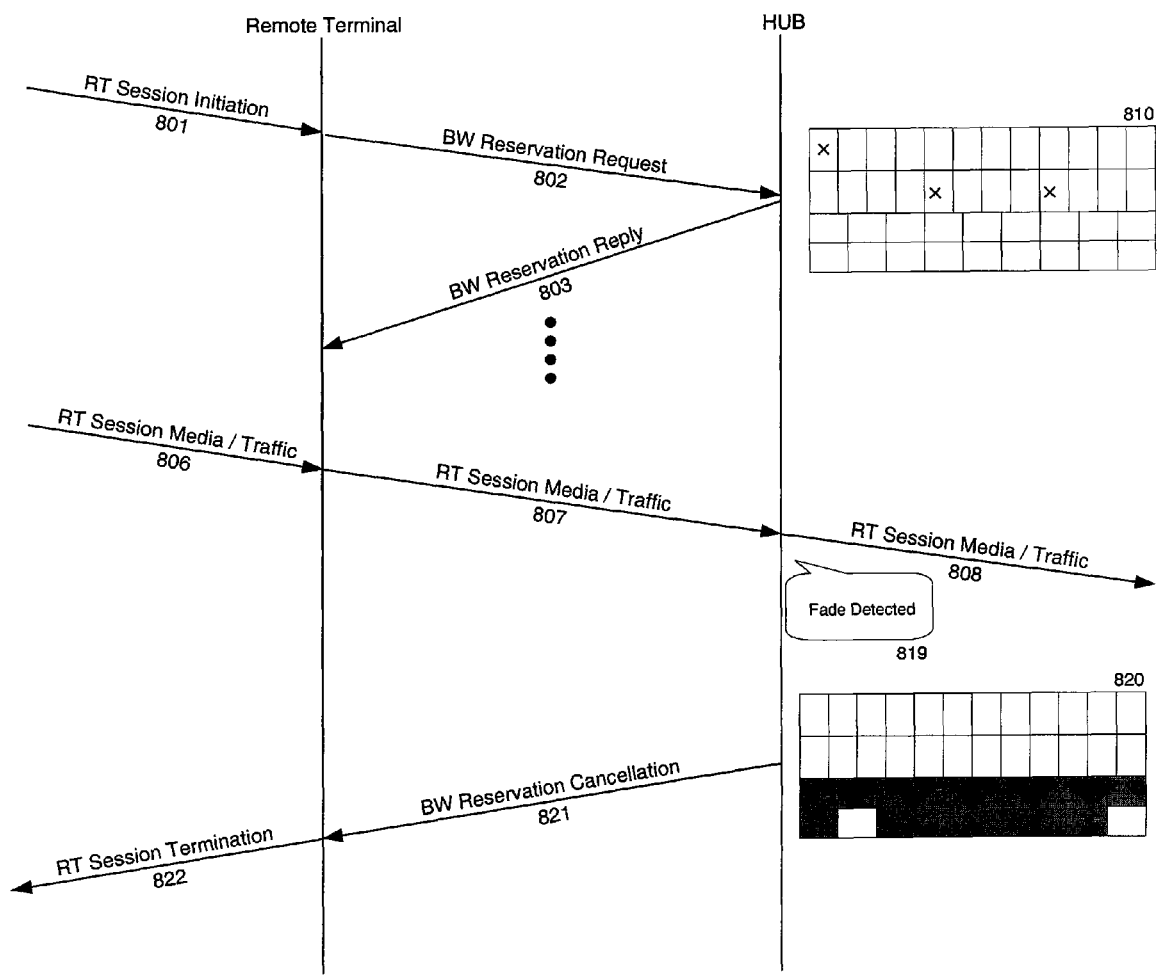
FIG. 8 shows a scenario where rain-fade is detected by the hub while a real-time session is active and where the hub cannot reallocate resources for the session.

FIG. 8 shows a scenario where rain-fade is detected by the hub while a real-time session is active and where the hub cannot reallocate resources for the session. Session setup is similar to the one described in FIG. 5 as shown by messages 801 to 808 and the example map 810. While the session is ongoing, the hub may detect degradation in the remote terminal's transmission capabilities (819) and determine the timeslots already allocated to the remote terminal as no longer usable. In this scenario, the hub cannot reallocate alternative and more robust timeslots, as most of these timeslots are already allocated to other sessions, as shown in the two lower rows of example map 820. The hub then terminates the connection by sending a bandwidth reservation cancellation 821 to the remote terminal, which may trigger the sending of a termination message 822 from the remote terminal to the end-point. Furthermore, the remote terminal stops forwarding any media packets such as 806, 807 and 808. In other embodiments, where the remote terminal does not support the protocol used by the end-point, the remote terminal may take other actions in order to terminate the session including taking no action at all except for dropping media packets received from the end-point. In that case, the session may eventually terminate using application signaling or any supervision properties of the end-point, such as timers on media packets.

Figure 9:
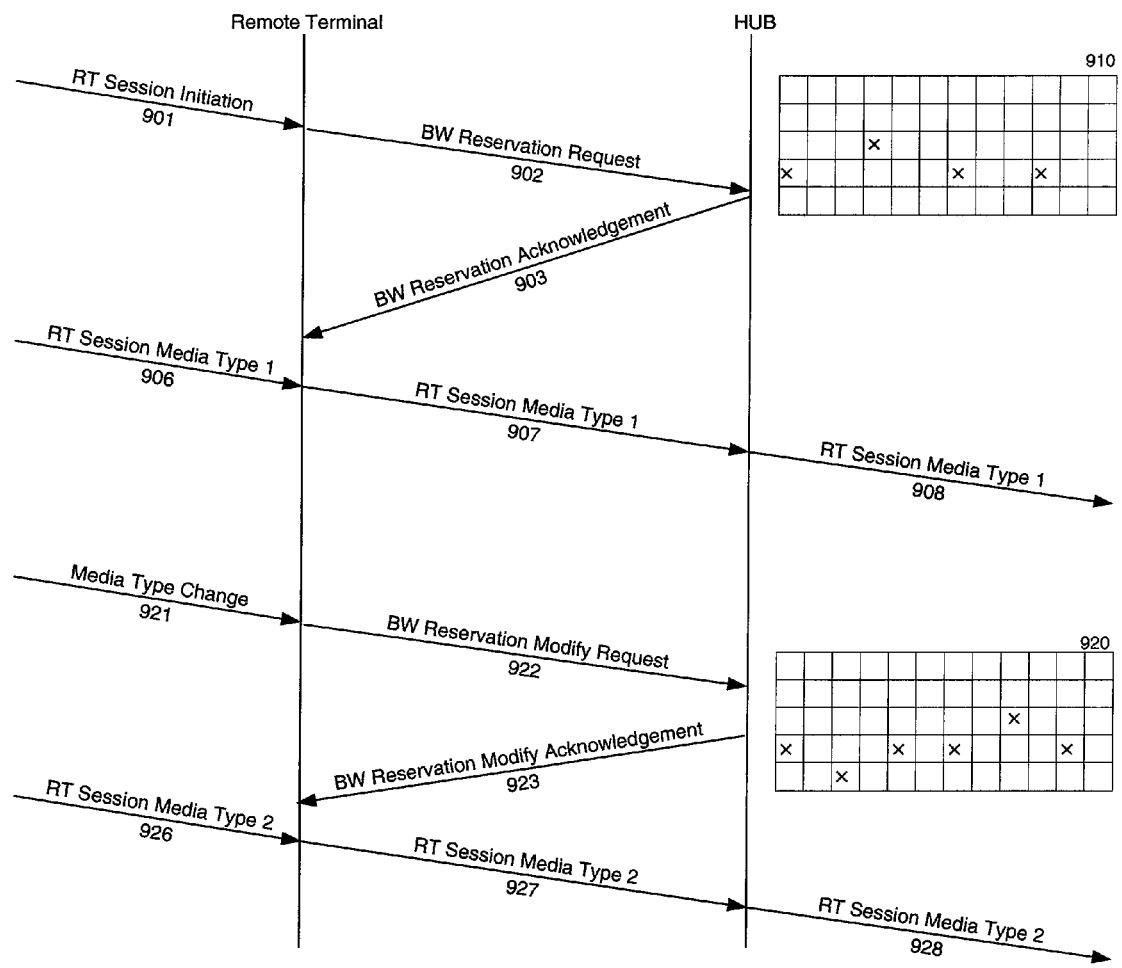
FIG. 9 shows a scenario of content type change during an active session.

FIG. 9 shows a scenario of content type change during an active session. Session setup is similar to the one described in FIG. 5 as shown by messages 901 to 908 and the example map 910. While the session is ongoing, the remote terminal may detect a change in media packet type 921, either by detecting the appropriate signaling or by analyzing the media packets themselves. The remote terminal may then send a bandwidth modification request 922 towards the hub. The hub may repeat the allocation procedure as in the case of initiating a session and produce a new about jitter-free allocation as shown in the example map 920. The hub may then send a bandwidth modification acknowledge 923 to the remote terminal. The remote terminal then continues to send media packets 926, 927 and 928 towards their destination using the new allocation.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method, comprising:
    receiving, at a hub of a reservation-based satellite communication network, a request for establishing one or more connections between a remote terminal and the hub, wherein said request corresponds to detecting one or more jitter sensitive applications at the remote terminal; and
    allocating at the hub bandwidth having an allowable jitter to the one or more jitter sensitive applications, wherein said allocating comprises:
        determining whether sufficient bandwidth capacity having the allowable jitter can be allocated for transmission by the remote terminal, wherein said determining comprises:
            marking all timeslots already allocated to connections associated with jitter-sensitive applications as inapplicable for allocation;
            calculating a number of timeslots required and an optimal interval between timeslots;
            determining a first possible allocation of free timeslots comprised of said number of timeslots at said interval up to a predefined allowed variance between each two consecutive timeslots; and
            determining one or more additional possible allocations if the first possible allocation cannot be realized;
        acknowledging establishment of one or more connections if sufficient bandwidth capacity having the allowable jitter is available; and
        rejecting the request if sufficient bandwidth capacity having the allowable jitter is not available, wherein upon said acknowledging the method further comprises:
            marking each established connection with a network-unique identifier comprised of one or more fields or parameters, wherein each network-unique identifier is usable for correctly scheduling content of an applicable session to be transmitted on applicable allocations;

providing said network-unique identifier to the remote terminal during connection establishment signaling; and using said network-unique identifier in an allocation table for marking timeslots allocated for each connection.

2. The method of claim 1, wherein said request is for establishing connections between two remote terminals and the hub, and wherein said allocating comprises allocating bandwidth having an allowable jitter for transmission by the two remote terminals.

3. The method of claim 1, wherein said request is for establishing connections between two remote terminals in a mesh topology, and wherein said allocating comprises allocating bandwidth having an allowable jitter for transmission and reception by the two remote terminals.

4. The method of claim 1, further comprising detecting jitter-sensitive applications by the hub.

5. The method of claim 1, wherein the request for establishing one or more connections specifies a sustainable data rate and a maximal data rate for at least one connection.

6. The method of claim 5, wherein the sustainable and maximal data rates are expressed in bits per second (bps), Kilobits per second (Kbps), or in bits, bytes, Asynchronous Transfer Mode (ATM) cells, or Moving Picture Experts Group (MPEG) frames, per a time interval.

7. The method of claim 1, wherein the request for establishing one or more connections does not specify any bandwidth or capacity requirements for at least one connection and the method further comprises receiving at the hub a request for modifying the bandwidth or the capacity allocated to the at least one connection after the at least one connection is established.

8. The method of claim 1, wherein the request for establishing one or more connections includes a jitter-sensitivity indication, either as a separate parameter or as a predefined value of a parameter.

9. The method of claim 1, further comprising:
receiving, at the hub, a request to modify one or more existing connections between a terminal and the hub, or between a first terminal and a second terminal;
determining whether sufficient bandwidth capacity having an allowable jitter can be allocated for transmission, and in case of mesh connectivity, also for one or more receiving remote terminals to receive;
acknowledging modification of said one or more connections if sufficient capacity having the allowable jitter is available; and
rejecting the request to modify said one or more connections while maintaining bandwidth already allocated prior to the request to modify if sufficient capacity having the allowable jitter is not available.

10. The method of claim 9, wherein said determining sufficient capacity further comprises:
marking all timeslots already allocated to jitter-sensitive connections as inapplicable for allocation, except timeslots currently allocated to one or more connections being modified;
calculating a number of timeslots required and an optimal interval between timeslots;
determining a first possible allocation of free timeslots including said number of timeslots at said interval up to a predefined allowed variance between each two consecutive timeslots;
determining one or more additional possible allocations if the first possible allocation cannot be realized; and
restoring an original allocation if no possible allocation under the modified capacity requirements can be realized.

11. The method of claim 1, further comprising:
detecting, at the hub, degradation in satellite link conditions of at least one terminal;
determining that said degradation cannot be compensated for by increasing the transmission power of the terminal;
determining whether one or more jitter-sensitive connections requested by said terminal are allocated one or more timeslots which are no longer sustainable by said terminal;
determining, for each said connection having one or more unsustainable timeslots, a first possible allocation of free timeslots comprised of said number of timeslots at said interval up to a predefined allowed variance between each two consecutive timeslots;
determining one or more additional possible allocations if the first possible allocation cannot be realized;
modifying allocations of said one or more connections if a possible allocation can be realized using timeslots sustainable by said terminal; and
leaving an existing allocation allocated if a new allocation cannot be realized.

12. The method of claim 11, further comprising:
determining that a new allocation cannot be realized; and
repeating, after a predefined interval, a determination of a first possible allocation of free timeslots and a determination of one or more additional possible allocations.

13. The method of claim 12, further comprising:
determining that a new allocation cannot be realized after a first attempt or after any one or more subsequent attempts; and
closing the one or more connections and notifying one or more terminals associated with the one or more connections.

14. The method of claim 11, wherein the degradation is in mesh reception conditions of a terminal.

15. The method of claim 1, wherein the satellite communication network employs a return-link access scheme selected from Digital Video Broadcasting - Return Channel via Satellite (DVB-RCS) (ETSI EN 301 790), a subset of DVB-RCS, or a superset of DVB-RCS.

16. The method of claim 1, wherein the satellite communication network employs a Connection Control Protocol (C2P), a subset of C2P, or a superset of C2P at least for establishing connections.

17. An apparatus, comprising:
at least one processor;
a memory storing instructions that when executed by the at least one processor cause the apparatus to:
receive a request for establishing one or more connections between a remote terminal and the apparatus, wherein said request corresponds to detecting one or more jitter sensitive applications at the remote terminal; and
allocate bandwidth having an allowable jitter to the one or more jitter sensitive applications by:
determining whether sufficient bandwidth capacity having the allowable jitter can be allocated for transmission by the remote terminal, wherein said determining comprises:
marking all timeslots already allocated to connections associated with jitter-sensitive applications as inapplicable for allocation;

calculating a number of timeslots required and an optimal interval between timeslots;

determining a first possible allocation of free timeslots comprised of said number of timeslots at said interval up to a predefined allowed variance between each two consecutive timeslots; and determining one or more additional possible allocations if the first possible allocation cannot be realized;

acknowledging establishment of one or more connections if sufficient bandwidth capacity having the allowable jitter is available; and rejecting the request if sufficient bandwidth capacity having the allowable jitter is not available, wherein upon said acknowledging, the instructions, when executed by the at least one processor cause the apparatus to:

mark each established connection with a network-unique identifier comprised of one or more fields or parameters, wherein each network-unique identifier is usable for correctly scheduling content of an applicable session to be transmitted on applicable allocations;

provide said network-unique identifier to the remote terminal during connection establishment signaling; and use said network-unique identifier in an allocation table for marking timeslots allocated for each connection.

* * * * *